United States Patent
Jones, Sr. et al.

(10) Patent No.: US 11,941,877 B2
(45) Date of Patent: Mar. 26, 2024

(54) REMOTE PRESENCE-BASED DRIVING OBSERVATION AND ASSESSMENT EXAMINATION ADMINISTRATION SYSTEM

(71) Applicants: Reginald S. Jones, Sr., Naperville, IL (US); Glenna W. Jones, Naperville, IL (US)

(72) Inventors: Reginald S. Jones, Sr., Naperville, IL (US); Glenna W. Jones, Naperville, IL (US)

(*) Notice: Subject to any disclaimer, the term of this patent is extended or adjusted under 35 U.S.C. 154(b) by 105 days.

(21) Appl. No.: 17/477,245

(22) Filed: Sep. 16, 2021

(65) Prior Publication Data

US 2022/0083760 A1 Mar. 17, 2022

Related U.S. Application Data

(60) Provisional application No. 63/079,288, filed on Sep. 16, 2020.

(51) Int. Cl.
| | |
|---|---|
| *G06N 20/00* | (2019.01) |
| *G06V 20/13* | (2022.01) |
| *G06V 20/52* | (2022.01) |
| *G08G 1/01* | (2006.01) |

(52) U.S. Cl.
CPC ............. *G06V 20/13* (2022.01); *G06N 20/00* (2019.01); *G06V 20/52* (2022.01); *G08G 1/0116* (2013.01)

(58) Field of Classification Search
CPC ........ G06V 20/13; G06V 20/52; G06V 20/00; G06V 40/172; G06V 40/10; G08G 1/0112; G08G 1/0133; G08G 1/0129; G08G 1/0116; G06N 20/00
See application file for complete search history.

(56) References Cited

U.S. PATENT DOCUMENTS

| | | | | |
|---|---|---|---|---|
| 10,625,745 B1* | 4/2020 | Tremblay | ............... | G06V 20/58 |
| 2016/0005332 A1* | 1/2016 | Cale | .......................... | G09B 5/00 |
| | | | | 434/65 |

FOREIGN PATENT DOCUMENTS

| | | | | | |
|---|---|---|---|---|---|
| KR | 2021028436 A | * | 3/2021 | ........... | G11C 11/221 |
| WO | WO-2021045446 A1 | * | 3/2021 | | |

OTHER PUBLICATIONS

Wu Y, Zhang D, Yuan X. Application of Artificial Intelligence in the Driver Road Test System. In Pervasive Computing and the Networked World: Joint International Conference, ICPCA/SWS 2013, Vina del Mar, Chile, Dec. 5-7, 2013. Rev. Selected Papers 2014 (pp. 686-697). Springer Intl Publishing. (Year: 2014).*

* cited by examiner

*Primary Examiner* — Vu Le
*Assistant Examiner* — Tracy Mangialaschi
(74) *Attorney, Agent, or Firm* — Barnes & Thornburg LLP

(57) ABSTRACT

Techniques are described herein for providing a system and techniques for remotely administering a practical exam, such as a road test component of a driver's license examination. A platform server receives streaming data captured by one or more audio and video sensors of a monitoring device located in a vehicle during the road test component. The platform server is at a location remote from the vehicle. The platform server identifies, from the streaming data, one or more events associated with an individual inside the vehicle taking the examination. The platform server evaluates each event against one or more rules of the road test component and generates an examination result based on the evaluation.

17 Claims, 5 Drawing Sheets

REMOTE PRESENCE-BASED DRIVING OBSERVATION AND ASSESSMENT EXAMINATION ADMINISTRATION SYSTEM

CROSS-REFERENCE TO RELATED APPLICATIONS

This application claims priority to U.S. Provisional Patent Application No. 63/079,288, filed Sep. 16, 2020.

TECHNICAL FIELD

The present disclosure generally relates to a system and techniques for remotely monitoring, administering, and assessing a practical examination, such as the road test component of a driver's license examination.

BACKGROUND

A driving test measures an ability of an individual to operate a vehicle in a manner that complies with predetermined rules and regulations enacted by a governmental organization. The driving test typically includes two components: a written test and a road test. The road test component is a practical examination that evaluates the ability of an individual (also referred to herein as a "test taker") to perform certain maneuvers while operating a vehicle (e.g., driving through cones, parking into a space, lane changing, etc.) in a controlled, real-time environment. Typically, an assessor (e.g., an individual tasked with administering the road test) accompanies the test taker in the test taker's vehicle to concurrently evaluate the test taker's performance of these maneuvers. Based on that evaluation, the assessor determines whether the test taker passes or fails the road test component of the driving test. There are significant limitations and drawbacks with having the assessor physically accompany the test taker in the test taker's vehicle to concurrently evaluate the test taker's performance, including the assessor's potential lack of objectivity and health concerns with having two individuals in such close proximity in the test taker's vehicle. Those health concerns have been amplified in view of recent circumstances, including the ongoing COVID-19 pandemic.

In the United States of America, each state has a set of rules and regulations that apply to both the written test component and the road test component of the driving test. While there is significant overlap of the rules and regulations across many states, there are some differences in these rules and regulations across some states depending upon the age and/or experience of the individual driver. Furthermore, there are different classes of driving licenses depending upon the type of vehicle(s) to be driven by the individual. For example, an individual can have a motorcycle license, a passenger vehicle license and/or a commercial truck license (e.g., a "CDL") license. These factors can complicate the administration of the road test and make it difficult for the assessor to fully evaluate the individual's performance while taking the road test.

Accordingly, there is an unmet need for an improved system for remotely monitoring and administering a practical examination, such as the road test component of a driver's license examination. The description provided in the Background section should not be assumed to be prior art merely because it is mentioned in or associated with the Background section.

SUMMARY

Embodiments presented herein disclose a system and techniques for providing a bi-directional platform for remote observation, administration and assessment of an examination. In one embodiment, the system is configured for remote, bi-directional monitoring, administering, and assessing the road test component of a driver's license examination. Additional structural and functional aspects and benefits of the bi-directional monitoring and administering system of the present disclosure are disclosed in the Detailed Description section and the Figures.

DETAILED DESCRIPTION

Figure 1:
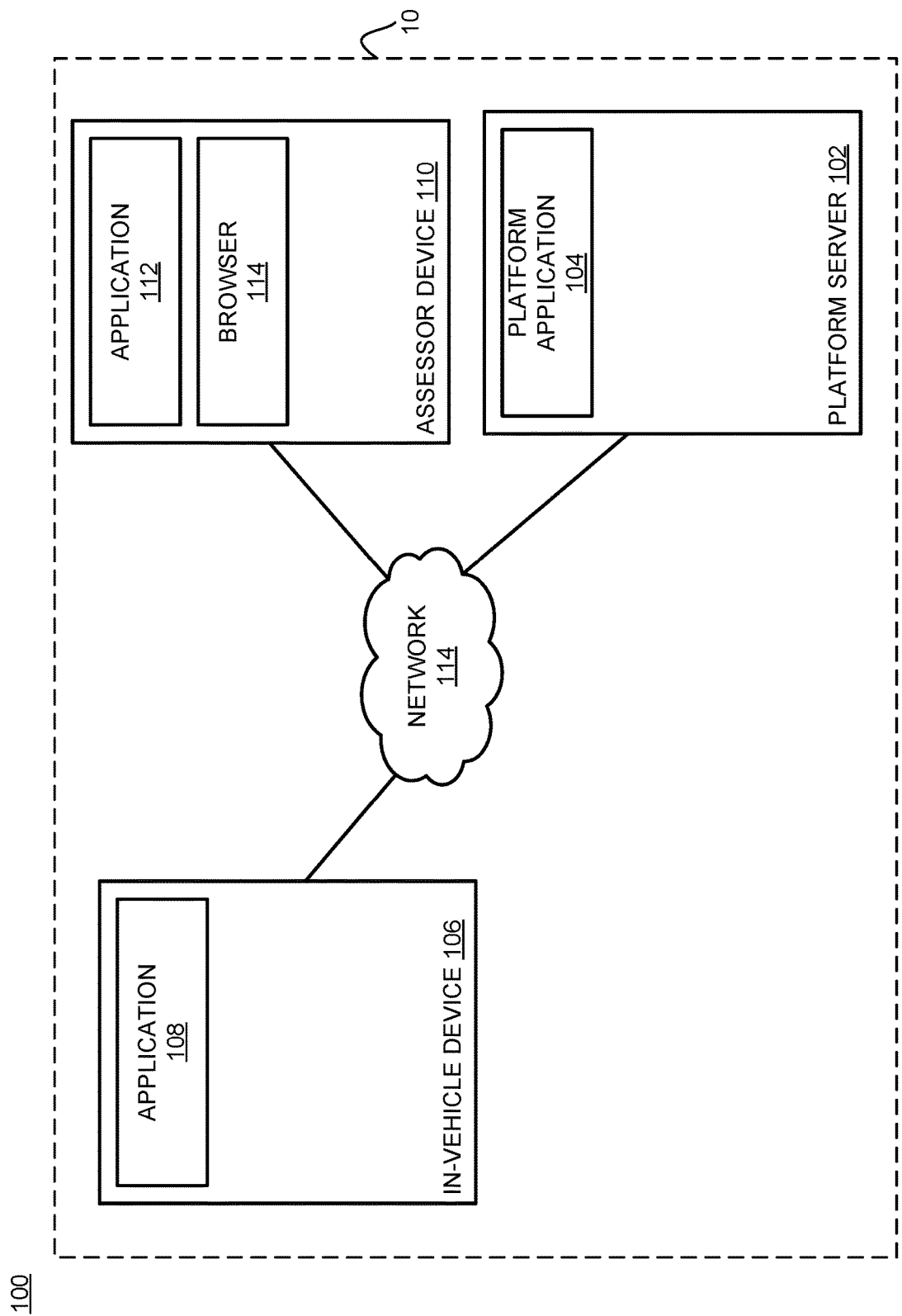
FIG. 1 illustrates an exemplary computing environment of the system for remote, bi-directional monitoring, administration, and assessment of a road test component of a driver's license examination, according to an embodiment.

Circumstances have demonstrated the drawbacks and limitations of requiring an assessor being physically present in a vehicle alongside an individual test taker during a road test component of a driver's license examination test. The novel coronavirus (COVID-19) pandemic has caused government services to enforce social distancing guidelines for public safety. Given such requirements, it is challenging and potentially unsafe to require the assessor to be in the same vehicle as the test taker during the road test. For instance, the road test component of the driver's licensing process in many States or jurisdictions cannot be administered without the in-vehicle assessor compromising a six-foot social distancing mandate. In addition, governmental driving test bodies (e.g., a Secretary of State and/or a Department of Motor Vehicles) have received complaints from test takers regarding inappropriate behavior by assessors and biased or inattentive assessors, where these complaints are lodged without an objective record to corroborate these claims.

Embodiments presented herein disclose a system or platform 10 with features and techniques for remotely administering, monitoring, and assessing the road test component of the driver's license examination test. More particularly, the system 10 allows an assessor (e.g., an individual tasked with administering a road test at a testing facility) to have a remote presence during the road test to eliminate the need for the assessor to be in the same vehicle as the test taker (e.g., an individual undergoing the road test at the testing facility). As further described herein, a remote examination administration platform provides bi-directional monitoring and administering of the road test component for a driver's license examination. For instance, the platform may receive audio and video streaming data in relative real-time from a monitoring device installed within a vehicle of a test taker. The platform may identify and divide the streaming data into discrete segments and classifiable events (e.g., the test taker starting the vehicle, activating a turn signal, executing a driving maneuver, etc.), which the platform can record and evaluate against objective criteria associated with those segments or events in grading the performance of the test taker. The assessor may also concurrently observe the performance of the test taker in relative real-time to provide feedback and further evaluate the performance.

Advantageously, the remote administration, monitoring, and assessment system 10 provides an approach that enables an assessor and test taker to perform the road test component of an examination without requiring one to be within the other's physical presence. Doing so affords the assessor and the test taker less infection risk than an approach that would have the assessor and test taker within the same vehicle. Further, the combined arrangement of system components, such as a monitoring device that is installable in multiple vehicles, allows for a road test to be restructured in a way that a single assessor can receive conduct multiple road tests at a time.

The arrangement of the components of the system 10 provides further advantages over typical approaches of remote video and audio communication between individuals. For example, a typical approach may include relying on users' personal mobile devices for a remote evaluation, such as those seen in areas such as telehealth, fitness form checks, and so on. Such an approach relies on a given user's control of the mobile device and computing capabilities (e.g., processing, networking, storage, etc.) of the device, which can affect how the content is evaluated (e.g., some evaluations cannot be conducted in real-time due to network limitations or processing limitations). For instance, some user devices can only access relatively obsolete mobile data networks (e.g., 3G data networks), and thus, streaming of video and audio may run at a delay or result in a low-resolution media quality. Further, the positioning of the user device in such an approach may be unreliable and leaves room for error. By contrast, embodiments of the system 10 presented herein disclose a closed loop system using standardized devices having computing resources sufficient to carry out the functions described herein compared to other preexisting approaches. The system 10 may leverage a combination of public and private networks to ensure that streaming of video and audio data is relatively seamless in real-time and that classifiable events are processed quickly (e.g., over a cloud network). The approach also involves a monitoring device placed in a predefined location within (or on) the vehicle, which allows for a consistent application of examination evaluation procedures.

Further advantageously, the techniques employed with the system 10 and described herein use a machine learning (ML)-based approach in identifying and classifying discrete events observed in video and audio data as a test taker is undergoing the road test. Using ML techniques can assist the system 10 in identifying certain driving behaviors that are normal for the purposes of the test and abnormal. The system 10 may generate data in analyzing a test taker's performance (e.g., explaining why a test taker failed a test). Further, the ML techniques may augment the evaluation process compared to typical automated evaluation processes that identify manually defined behaviors.

The following detailed description includes references to the accompanying Figures. In the Figures, similar symbols typically identify similar components, unless context dictates otherwise. The example embodiments described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

Note, the following description provides a driving test as a reference example of a practical examination that may be remotely administered using the system 10 and its techniques described herein. However, one having skill in the art will recognize that the embodiments of the system 10 presented herein may be adapted to a number of use cases outside of or related to this reference example. For example, embodiments may be adapted to a motorcycle road test examination in which the in-vehicle hardware described herein is situated atop or affixed to the motorcycle itself. As another example, embodiments may be adapted to a road test portion of a commercial driver's license application process. As yet another example, embodiments of the system 10 may be adapted to tests for operating certain heavy machinery or industrial equipment (e.g., farm equipment, excavation vehicles and mining equipment).

FIG. 1 illustrates an example computing environment 100 in which a road test may be remotely administered by an assessor situated outside a vehicle, according to an embodiment. As shown, the computing environment 100 includes the system 10, which itself includes a platform server 102, an in-vehicle device 106, and an assessor device 110, each connected to one or more networks 114 (e.g., the Internet, mobile networks, WiFi networks, etc.). The platform server 102 and the assessor device 110 may be embodied as a physical hardware device (e.g., a desktop computer, laptop computer, tablet computer, workstation, etc.). As further described below, the platform server 102 may correspond to a cloud-based application or server. The in-vehicle device 106 may be embodied as a portable camera and communication device to provide real-time visual and audio recording and two-way communications. The assessor device 110 may execute a web-based application to enable an assessor or operator to interact with a test taker. The network 114 may be a combination of public and private networks, including cloud provider networks. For example, the in-vehicle device 106, device 110, and platform server 102 may be connected within a private enterprise network. The platform server 102 may also be interconnected with a cloud network to transmit raw data for processing under ML algorithms.

In an embodiment, the platform server 102 provides a software-based platform for administering a road test remotely relative to a vehicle. The platform integrates with existing licensure and application workflows for a given State, jurisdiction or regulatory body on both an upstream and downstream basis. Illustratively, the platform server 102 includes a platform application 104, which can be embodied as any hardware, software, or circuitry for receiving streaming data from a vehicle (e.g., the in-vehicle device 106 installed within the vehicle), such as audio and video data, and discretizing the streaming data into one or more events. These events may include any action or behavior performed by or around the individual during a road test. For example, such events can include the test taker starting the vehicle, putting on a seat belt, accelerating the vehicle, executing a driving maneuver, looking at the rear- and side-view mirrors, and so on. Events can also include external audio and video data captured in or around the vehicle, such as loud dull noises (e.g., indicative of the vehicle driving over a curb), vehicle horn noises, weather, and the like. The platform server 102 may concurrently transmit the streaming data to an external device, such as the device 110 operable by a human assessor (e.g., an instructor qualified to evaluate the performance of a test taker under a particular state's driving rules and regulations). The human assessor may then view and provide feedback regarding the performance of the test taker in relative real-time, e.g., through an application 112 integrated with the platform application 104 or through a web interface displayable by a browser 114.

As further described herein, the application 104 may use machine learning (ML) techniques (e.g., reinforcement learning, classification, deep learning, and a variety of other ML techniques) and business rules to evaluate identified events against one or more rules. The rules are predefined criteria used to determine whether the test taker passes or fails the road test. For example, the rules may be based on objective and standardized criteria, such as a driver's handbook for a given state. The platform server 102 may generate an examination result and send the examination result to a human assessor using the device 110 thereafter, allowing the human assessor to make a further determination as to whether the test taker passes or fails the road test.

In an embodiment, the in-vehicle device 106 is a portable external hardware device removably attachable inside or on a vehicle. For example, the in-vehicle device 106 may be: placed on the inner windshield, attached to the headrest or a pillar of the vehicle's roof support structure, or placed on or above the dashboard of the vehicle. The in-vehicle device 106 is designed to be both durable and easy to handle and operate because it will be repeatedly installed, used, and uninstalled in numerous vehicles during the course of the day that the system 10 is being used. The in-vehicle device 106 may include multiple high-definition (HD) cameras residing within an external, protective device housing to capture simultaneous streams of video data within and around the vehicle and of the test taker while performing the road test component of the driving test. For example, one of the cameras may face a forward direction to allow the in-vehicle device 106 to capture a view through the windshield of the vehicle and forward of the vehicle, while another of the cameras may be oriented to capture a view through one of more side windows of the vehicle and to the side of the vehicle, and while at least one other of the cameras may face rearward (or other perspectives within the vehicle) to capture a view within the interior of the vehicle, including a view of the test taker while performing the road test, and through the rear window of the vehicle to capture the area behind the vehicle. The in-vehicle device 106 then includes audio devices, e.g., a microphone and speaker, to allow for audio data to be transmitted to and received from the platform server 102. Further, the in-vehicle device 106 may provide network communication components to enable such communications to occur. Such network communication components may serve as network uplink and downlink for cameras, two-way voice communication, and geo-compassing. Further, the components may use various methods of encryption to enable secure transmission of the data to and from the platform server 102. Further still, in another embodiment of the system 10, a test taker may removably attach multiple in-vehicle devices 106 within or on the vehicle (e.g., on the hood or roof of the vehicle) to capture and transmit various audio and video feeds during a road test to the platform server 102. Further, the in-vehicle device 106 may save video and audio data in local storage thereon. This functionality allows the in-vehicle device 106 to preserve the video and audio data in the event of a disruption between the platform server 102 and the in-vehicle device 106. Upon reestablishing a connection between devices, the device 106 may upload the video and audio data to the platform server 102 for viewing by the assessor via device 110.

As stated, the platform server 102 allows the human assessor (typically located inside a given testing facility, such as a State's Department of Motor Vehicles) to view and provide feedback on a performance of a test taker from the device 110. For example, the application 112 may receive video and audio stream information associated with an examination session. The application 112 may also transmit video and audio to the platform server 102, which may then be transmitted by the platform server 102 to the in-vehicle device 106. The application 112 provides the assessor with real-time demonstration examination telemetry obtained from the in-vehicle device 106, such as location, speed, duration and the like. The application 112 may also be configured to provide pre-defined alerts based on events identified by the platform application 104. For example, the application 112 may determine that an event takes place in which the test taker exceeds the designated speed limit for a portion of the road test. In such a case, the application 112 may generate an alert that includes the test taker ID, a description of the alert (e.g., exceeded speed limit), and a timestamp associated with the event. In an embodiment, the application 112 may enable the assessor to conduct multiple road tests concurrently with one another. For example, the application 112 may receive real-time streaming data captured by multiple in-vehicle devices 106 concurrently with one another.

Figure 2:
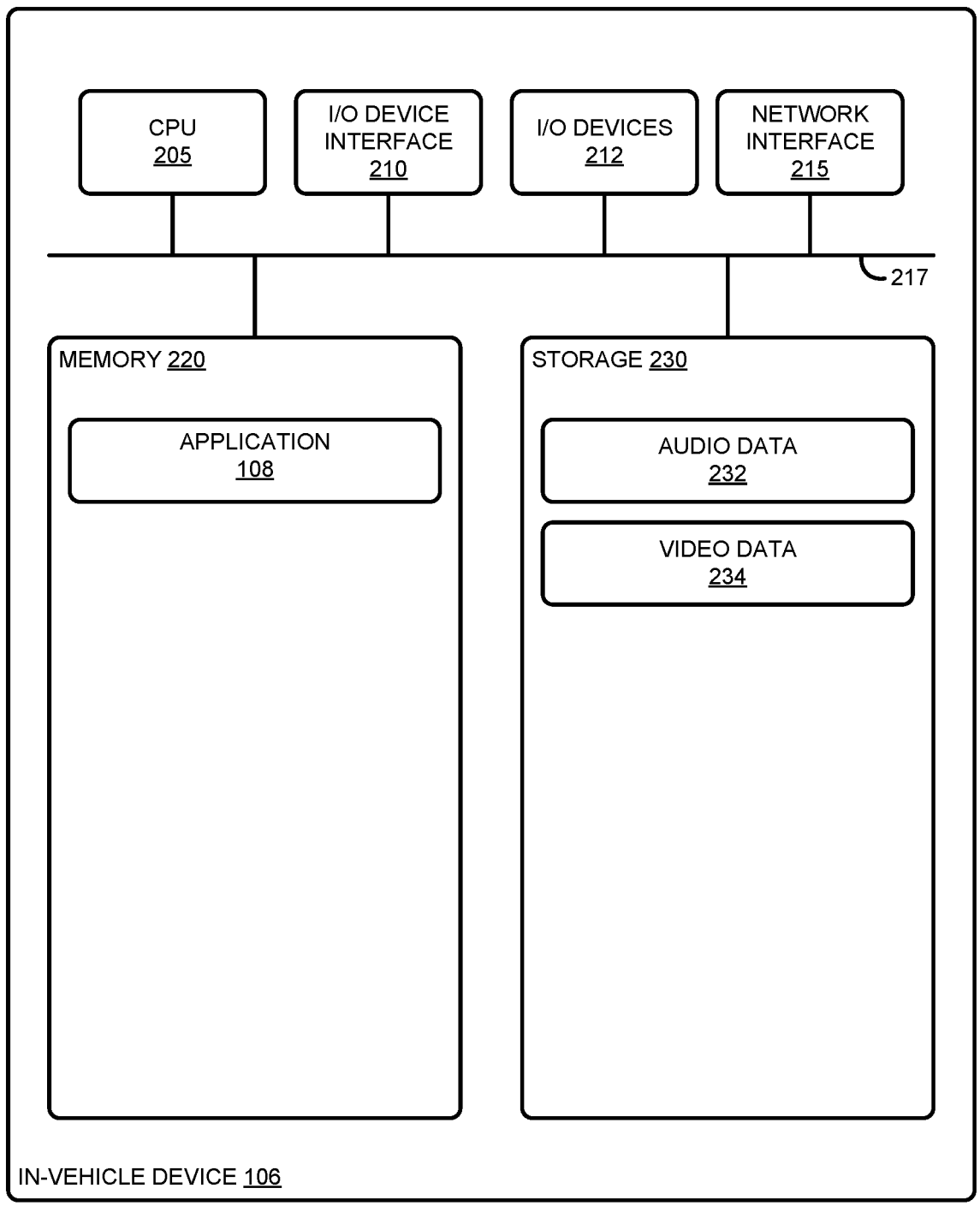
FIG. 2 illustrates a block diagram of the in-vehicle device of the monitoring, administration, and assessment system of FIG. 1, according to an embodiment.

FIG. 2 further illustrates the in-vehicle device 106, according to an example embodiment. As shown, the in-vehicle device 106 includes, without limitation, a central processing unit (CPU) 205, an I/O device interface 210, one or more I/O devices 212, and a network interface 215, each interconnected via a hardware bus 217. Of course, an actual in-vehicle device 106 will include a variety of additional hardware components not shown, such as accelerometer and gyroscope components to measure vehicle driving metrics, such acceleration, direction, position, and geolocation information.

The CPU 205 retrieves and executes programming instructions stored in the memory 220 (e.g., of the application 110). Similarly, the CPU 205 stores and retrieves audio data 232 and video data 234 residing in the storage 230. The hardware bus 217 is used to transmit instructions and data between the CPU 205, storage 230, network interface 215, and the memory 220. CPU 205 is included to be representative of a single CPU, multiple CPUs, a single CPU having multiple processing cores, and the like. The memory 220 is generally included to be representative of memory and storage on a mobile device, e.g., DDR and flash memory spaces. The network interface 215 may be embodied as any hardware, software, or circuitry (e.g., a network interface card) used to connect the in-vehicle device 106 over a network and providing the network communication component functions described above.

The I/O device interface 210 allows the I/O devices 212 to communicate with hardware and software components of the in-vehicle device 106. The I/O devices 212 may be embodied as any type of input/output device connected with or provided as a component to the in-vehicle device 106, such as the HD cameras and speaker and microphone devices described above. I/O devices such as keyboards, mice, and printers may be included as I/O devices 212 (e.g., to print an examination result or enter profile data associated with the test taker). Illustratively, the memory 220 includes the application 108 which carries out functions such as capturing, transmitting, receiving, and storing audio data 232 and video data 234.

Figure 3:
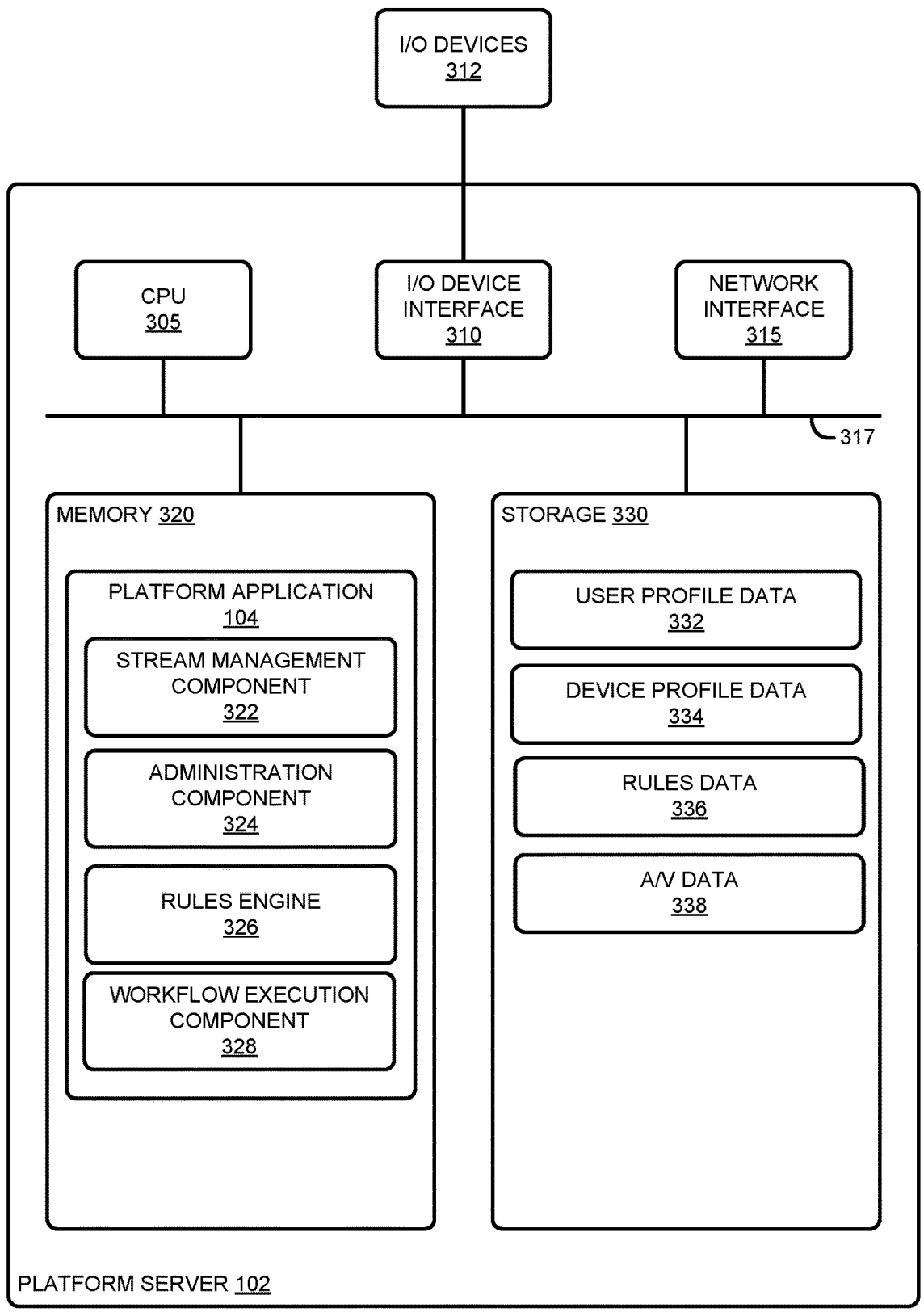
FIG. 3 illustrates a block diagram of the platform server of the monitoring, administration and assessment system of FIG. 1, according to an embodiment.

FIG. 3 further illustrates the platform server 102, according to an example embodiment. As shown, the platform server 102 includes, without limitation, a central CPU 305, an I/O device interface 310, one or more I/O devices 312, and a network interface 315, each interconnected via a hardware bus 317. Of course, a platform server 102 will include a variety of additional hardware components. Further, some components shown herein, such as the storage 330, can reside separate from the platform server 102 (e.g., as cloud storage or a remote storage host).

The CPU 305 retrieves and executes programming instructions stored in the memory 320 (e.g., of the platform application 104). Similarly, the CPU 305 stores and retrieves data residing in the storage 330, such as a profile data 332, rules data 334, and audio/visual (A/V) data. The hardware bus 317 is used to transmit instructions and data between the CPU 305, storage 330, network interface 315, and the memory 320. CPU 305 is included to be representative of a single CPU, multiple CPUs, a single CPU having multiple processing cores, and the like. The memory 320 is generally included to be representative of memory and storage on a mobile device, e.g., DDR and flash memory spaces. The network interface 315 may be embodied as any hardware, software, or circuitry (e.g., a network interface card) used to connect the platform server 102 over a network and providing the network communication component functions described above.

The I/O device interface 310 allows the I/O devices 312 to communicate with hardware and software components of the platform server 102. The I/O devices 312 may be embodied as any type of input/output device connected with or provided as a component to the platform server 102, such as keyboards, mice, and printers may be included as I/O devices 212 (e.g., to print an examination result or enter profile data associated with the human assessor).

Illustratively, the memory 220 includes the platform application 104, which itself includes a stream management component 322, an administration component 324, a rules engine 326, and a workflow execution component 328. Further, the storage 330 includes user profile data 332, device profile data 334, rules data 336, and A/V data 338. The user profile data 332 may be embodied as any data managing information associated with a test taker (e.g., personal information, historical driving record data, test taking data, etc.) and a human assessor (e.g., personal information, tests evaluated by the assessor, performance evaluations of the assessor, etc.). The device profile data 334 may be embodied as any data including identifying information (e.g., identifiers, network address information, etc.) associated with each in-vehicle device registered with the platform server 102. The rules data 336 may be embodied as any data providing rules used during a road test session and conditions for satisfying or scoring these rules. For example, a given rule may correspond to a particular test criterion, such as the test taker being able to successfully execute each step of a given maneuver, in which each condition of the rule corresponds to one of the steps. Another example of a given rule can include the test taker being able to perform certain pre-checks prior to taking the vehicle out of the parking gear, such as putting on a seatbelt, checking the mirrors, and locking the doors. Conditions for satisfying the rule may correspond with successfully performing those pre-checks. The A/V data 338 may be embodied as any audio and video data obtained from an in-vehicle device. The A/V data 338 may also include metadata for associating particular A/V data with a particular test taker, assessor, and session. For example, this may be carried out using identifiers for each of the A/V data 338, test taker, assessor, and session, and mapping those identifiers with one another via one or more tables.

The illustrative stream management component 322 may be embodied as any software, device, or circuitry to receive and manage stream data (e.g., as A/V data 338). For example, the stream management component 322 ensures video and audio quality as well as records and archives the A/V data 338. The stream management component 322 may transmit the A/V data 338 bi-directionally (e.g., sending the A/V data to the test taker within the vehicle or to the assessor administering the examination).

The illustrative administration component 324 may be embodied as any software, device, or circuitry to manage the user profile data 332. For example, the administration component 324 may integrate with testing demographic data and evaluator records maintained by a government Department of Motor Vehicles.

The illustrative rules engine 326 may be embodied as any software, device, or circuitry to discretize video and audio data into individual events using ML techniques on the video and audio data as well as the metadata associated with that data and to manage and apply the rules data 336 to the discretized events. For example, the rules engine 326 may be trained to recognize using pre-existing video and audio data to recognize predefined events based on items to be evaluated during the road test (e.g., the driver's ability to maintain speed, stop at a stop sign or red light, ensure that the seatbelt is secured prior to shifting from park, etc.). Over time, as more test taker data is collected, the rules engine 326 may further be augmented to learn normal driving behavior during the exam to further allow the application 104 to identify anomalous behavior.

Further, the rules engine 326 is configured to receive, as input, one or more events from a given road test session. Based on the input, the rules engine 326 may evaluate the events against the rules data 336 and output a result (e.g., "Pass," "Fail," or "No Decision") and/or score based on the evaluation. The illustrative workflow execution component 328 may be embodied as any software, device, or circuitry to provide these inputs to the rules engine 326 and apply the resulting output. Further, as described above, the rules engine 326 may use a number of ML techniques to learn normal patterns of driving behavior and consequently learn anomalous driving behavior. Doing so may allow the platform application 104 to better identify instances in which a road test instance deviates from the norm.

Figure 4:
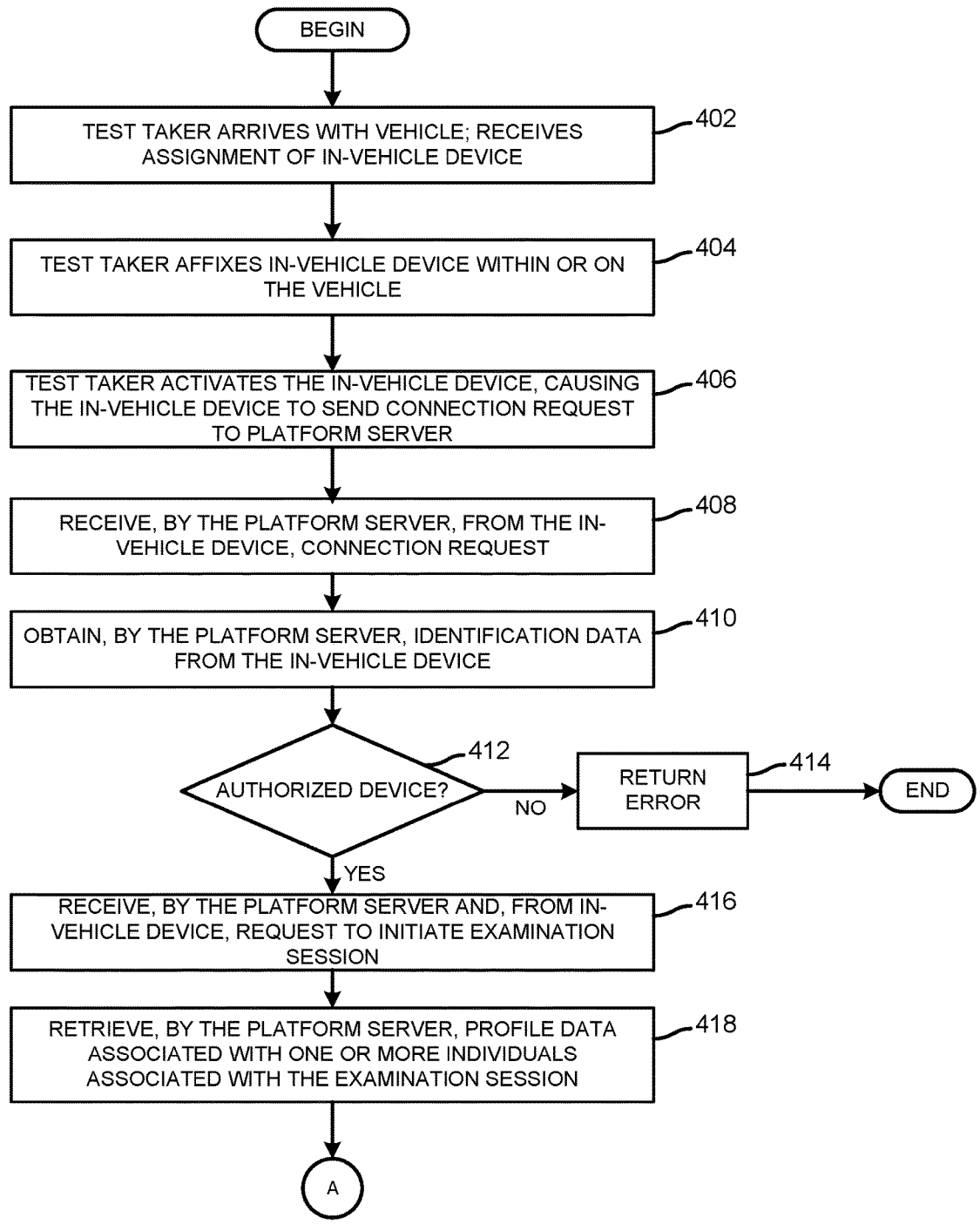
FIG. 4 illustrates a flow diagram of an exemplary method for establishing communications between the in-vehicle device and platform server as part of the monitoring, administration, and assessment system of FIG. 1, according to an embodiment.

FIG. 4 illustrates a method 400 for initiating a connection and road test session between the platform server 102 and the in-vehicle device 106. As shown, the method 400 begins in block 402, in which a test taker arrives with a vehicle to a testing site. The test taker may receive the in-vehicle device 106 at the testing site (or may have had the in-vehicle device 106 delivered previously to the test taker) and other information, such as an assignment of an assessor, road test instructions, and instructions on how to affix the in-vehicle device 106 to the vehicle. In block 404, the test taker affixes the in-vehicle device 106 to the vehicle, e.g., within or on the vehicle. In block 406, the test taker activates the in-vehicle device 106. Doing so causes the in-vehicle device 106 to send a connection request over the network 114 to the platform server 102, located remotely from the in-vehicle device 106. The connection request may include an identified associated with the in-vehicle device 106, a distinct password associated with the in-vehicle device 106 used to authenticate with the platform server 102, a unique session identifier (e.g., used to associate a local recording with a given testing session), and so on.

In block 408, in which the platform server 102 receives, from the in-vehicle device 106, a connection request. In block 410, the platform server 102 obtains, from the in-vehicle device 106, identification data. For example, the in-vehicle device 106 may provide a value uniquely identifying the in-vehicle device 106 (e.g., a Media Access Control (MAC) address or a universally unique identifier (UUID)). In an embodiment, the in-vehicle device 106 provides this information along with or as part of the connection request.

In block 412, the platform server 102 determines whether the in-vehicle device 106 is an authorized device. For example, to do so, the platform server 102 may evaluate the identification data against device profile data 334 stored on the platform. If the platform server 102 is unable to match the identification data with a device profile, then in block 414, the platform server 102 may return an error and abort the connection establishment attempt, in which case method 400 ends.

Otherwise, if the platform server 102 is able to identify the in-vehicle device 106 as an authorized device, the platform server 102 may establish the connection. Doing so enables two-way communication between the in-vehicle device 106 and the device 110, such that the test taker is able to talk with the assessor, and vice versa. Then in block 416, the platform server 102 receives, from the in-vehicle device 106, a request to initiate an examination session. In block 418, the platform server 102 retrieves profile data associated with one or more individuals (e.g., the test taker, the assessor, etc.) associated with the examination session. The flow may continue from block 420 to method 500.

Figure 5:
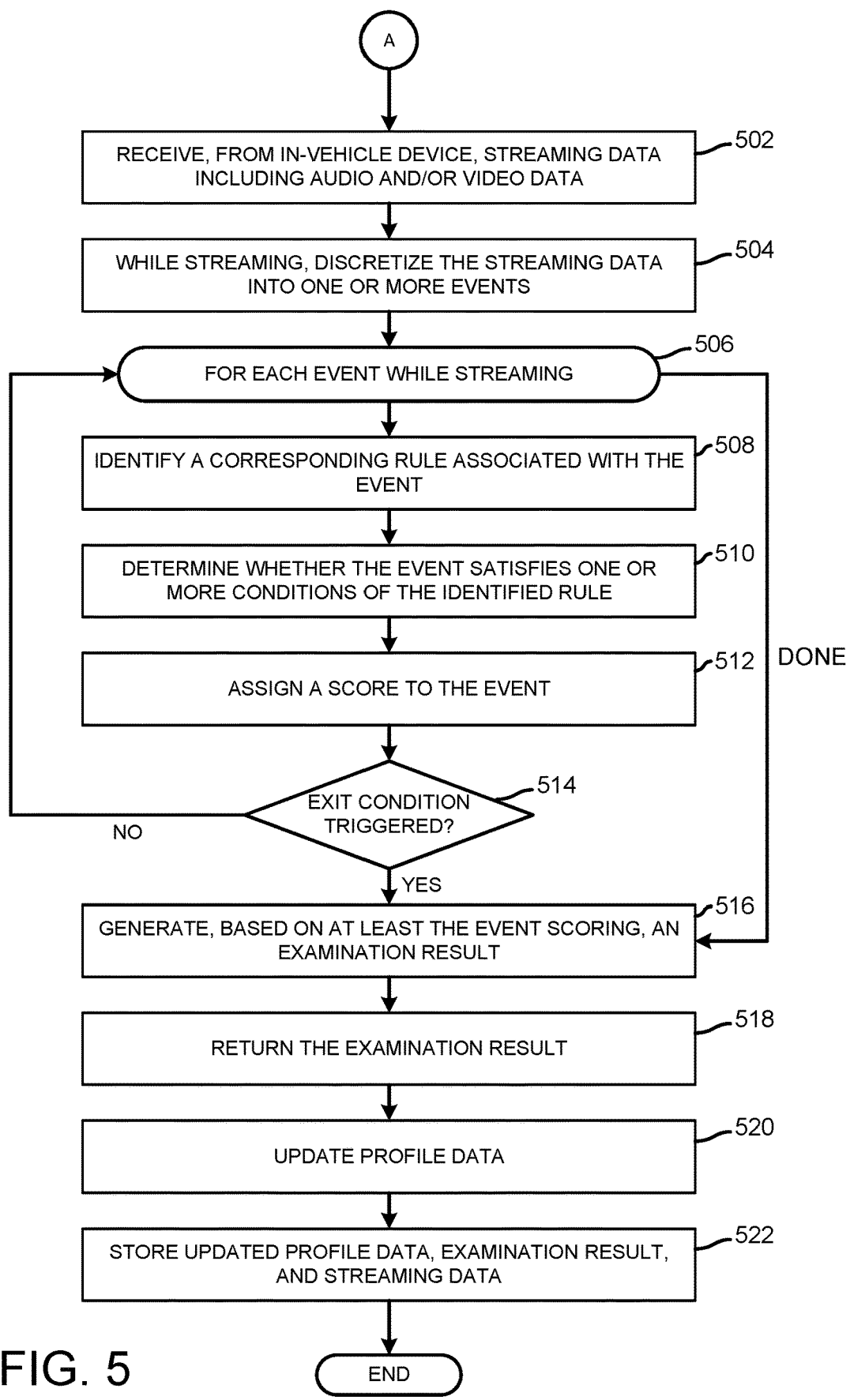
FIG. 5 illustrates a flow diagram of an exemplary method for assessing a test taker's performance during a road test as part of the monitoring, administration, and assessment system of FIG. 1, according to an embodiment.

FIG. 5 illustrates a method 500 for administering a practical examination, e.g., a road test. For instance, method 500 may be triggered by an initiation of the examination session discussed relative to block 420 of FIG. 4. As shown, the method 500 begins in block 502, in which the platform server 102 receives, from the in-vehicle device 106, streaming data including audio and/or video data. In block 504, while streaming, the platform server 102 discretizes the streaming data into one or more events associated with the test taker undergoing the examination. As an example, to do so, the platform server 102 may use a variety of machine learning techniques (e.g., image/audio classification, neural network techniques, and the like) on the input audio and video data to classify discrete events as, e.g., a particular driving maneuver, a gesture by the test taker, a shift of the gear from reverse to drive, an activation of the turn signal, etc. Further, during this step, the platform server 102 may concurrently transmit the streaming data to a requesting application, such as the application 112 executing on the device 110 operated by the assessor.

In block 506, the platform server 102 performs the following steps on each event while the streaming data is being transmitted. In block 508, the platform server 102 identifies a corresponding rule associated with the event. For example, the platform server 102 may have previously classified the event as a lane change event. In block 510, the platform server 102 determines whether the event satisfies one or more conditions of the identifier rule. For example, the conditions may include whether the test taker makes a gesture to look at the mirror and blind spot, activates the turn signal, and engages with the steering wheel to make the lane change.

Based on the evaluation, in block 512, the platform server 102, potentially with the assistance and input of the assessor, assigns a score for each event. The score is an indicator of the test taker's ability that allows the assessor to make a pass/fail decision on the road test, either in part or in whole. The assessor also has the authority and discretion to have the test taker retake any and all maneuvers associated with the event(s) to determine a final score. For example, assume that the platform server 102 detects the test taker performing a maneuver that deviates from a requested maneuver (e.g., the test taker has forgotten to activate a turn signal on a three-point turnabout). To do so, the platform server 102, using ML techniques, may determine a score indicating a likelihood that the maneuver deviates from what an expected performance. The platform server 102 may evaluate this score against a threshold and determine that the maneuver deviates if the threshold is exceeded. The platform server 102 may push an alert to the device 110 to notify the assessor of the deviation. The assessor may then communicate a request via the application 112 to the test taker in the vehicle to perform the maneuver again while taking into account the action that led to the prior deviation.

In some cases, an exit condition rule may be identified and triggered. An exit condition rule may pertain to an instance in which, e.g., a test taker immediately fails the road test. For example, an exit condition can be triggered in the event the test taker causes the vehicle to collide with an object or multiple objects. In block 514, the platform server 102 determines whether an exit condition has been triggered. If so, then the platform server 102 exits the loop of block 506 and proceeds to block 516. Otherwise, the method 500 returns to block 506 until complete.

In block 516, the platform server 102 generates, based on at least the event scoring, an examination result or analysis. This can include a listing of identified events and accompanying scores. In block 518, the platform server 102 returns the examination result, e.g., to the application 112 executing on device 110, allowing the assessor to perform additional analysis. In block 520, at the conclusion of the road test, the platform server 102 updates profile data associated with each the test taker and the assessor. In block 522, the platform server 102 stores the updated profile data, examination result, and streaming data in a storage location (e.g., locally or on a remote server). The stored data may later be accessed for a variety of purposes, such as for aggregation of testing results and metrics, demographic analysis, and assessor audits. For example, the platform server 102 may generate analytics relating to test performance by certain demographics, test results based on time of day that the examination is taken, and assessor passage and failure rates.

At the completion of the road test by the test taker, the test taker may receive the result of the examination, e.g., via communication by the assessor through the in-vehicle device 106, or a notification sent to the test taker's personal device. The test taker could then remove the in-vehicle device 106 and return the in-vehicle device 106 to the assessor or via some secure transfer method, such as a drop-box, mailing, and the like.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration only, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media which may be read and executed by one or more processors. A machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided in sub-modules, sub-processes or other units of computer code or data as may be required by a particular design or implementation of the computing device.

In the drawings, specific arrangements or orderings of elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships, or associations between elements may be simplified or not shown in the drawings so as not to obscure the disclosure.

This disclosure is considered to be exemplary and not restrictive. In character, and all changes and modifications that come within the spirit of the disclosure are desired to be protected. While particular aspects and embodiments are disclosed herein, other aspects and embodiments will be apparent to those skilled in the art in view of the foregoing teaching.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for remotely administering a road test component of a driver's license examination, the computer-implemented method comprising:
    receiving, by execution of a platform server over a combination of public and private networks, streaming data captured by one or more audio and video sensors of a monitoring device affixed to a vehicle during the road test component of the driver's license examination, the platform server being at a location remote from the vehicle;
    identifying, by the platform server and from the streaming data, one or more events of an individual inside the vehicle taking the road test component of the driver's license examination and of actions around the individual and exterior of the vehicle;
    classifying, by the platform server using a machine learning technique, the one or more identified events;
    transmitting, by the platform server and via the private network, the streaming data to a device operated by an assessor of the driver's license examination;
    evaluating, by the platform server, each classified event against one or more rules associated with the road test component; and
    generating, by the platform server, an examination result based on the evaluation.

2. The computer-implemented method of claim 1, further comprising, generating, by the platform server and based on the evaluation of each event, a score for the individual taking the road test component for each of the one or more events, wherein the examination result is generated based on the score for each of the one or more events.

3. The computer-implemented method of claim 1, wherein evaluating each event against the one or more rules comprises determining, by the platform server and based on one or more machine learning techniques, a score indicating the likelihood that the event deviates from an expected maneuver by the individual taking the road test component.

4. The computer-implemented method of claim 3, further comprising, upon determining that the score exceeds a specified threshold:
    generating, by the platform server, an alert; and
    sending, by the platform server, the alert to the device operated by an assessor of the driver's license examination.

5. The computer-implemented method of claim 4, further comprising, updating, by the platform server, profile data associated with the individual taking the road test component to include the examination result.

6. The computer-implemented method of claim 5, further comprising:
    aggregating, by the platform server, the profile data with profile data associated with a plurality of test takers; and
    generating, by the platform server, one or more analytics based on the aggregated profile data.

7. A remote administration system for a road test component of a driver's license examination, the remote administration system comprising:
    a monitoring device having one or more audio and video sensors, the monitoring device affixed to a vehicle connected over a combination of public and private networks;
    an assessor device connected over the private network at a first location remote from the vehicle; and
    a platform server connected over the combination of public and private networks at a second location remote from the vehicle, the platform server including one or more processors and a memory storing instructions, which, when executed by the one or more processors, causes the platform server to:
        receive, over the combination of public and private networks from the monitoring device, streaming data captured by the one or more audio and video sensors during the road test component of an examination;
        identify, from the streaming data, one or more events of an individual inside the vehicle taking the road test component of the driver's license examination and of actions around the individual and exterior of the vehicle;

classify, using a machine learning technique, the one or more identified events;

transmit, via the private network, the streaming data to the assessor device;

evaluate each event against one or more rules associated with the road test component; and generate an examination result based on the evaluation.

8. The remote administration system of claim 7, wherein the instructions, when executed, further cause the platform server to generate, based on the evaluation of each event, a score for the individual taking the road test component for each of the one or more events, wherein the examination result is generated based on the score for each of the one or more events.

9. The remote administration system of claim 7, wherein to evaluate each event against the one or more rules comprises to determine, based on one or more machine learning techniques, a score indicating the likelihood that the event deviates from an expected maneuver by the individual taking the road test component.

10. The remote administration system of claim 9, wherein the instructions, when executed, further cause the platform server to, upon determining that the score exceeds a specified threshold:

generate an alert; and send the alert to the assessor device.

11. The remote administration system of claim 10, wherein the instructions, when executed, further cause the platform server to update profile data associated with the individual taking the road test component to include the examination result.

12. The remote administration system of claim 11, wherein the instructions, when executed, further cause the platform server to:

aggregate the profile data with profile data associated with a plurality of test takers; and generate one or more analytics based on the aggregated profile data.

13. A platform server of a remote administration system for a road test component of a driver's license examination, comprising:

one or more processors;

a memory storing instructions, which, when executed by the one or more processors, causes the platform server to:

receive, over a combination of public and private networks, streaming data captured by one or more audio and video sensors of a monitoring device of the remote administration system, the monitoring device affixed to vehicle during the road test component of the driver's license examination at a location remote from the platform server;

identify, from the streaming data, one or more events of an individual inside the vehicle taking the road test component of the driver's license examination and of actions around the individual and exterior of the vehicle;

classify, using a machine learning technique, the one or more identified events;

transmit, via the private network, the streaming data to a device operated by an assessor of the driver's license examination;

evaluate each event against one or more rules associated with the road test component; and generate an examination result based on the evaluation.

14. The platform server of claim 13, wherein the instructions, when executed, further cause the platform server to generate, based on the evaluation of each event, a score for the individual taking the road test component for each of the one or more events, wherein the examination result is generated based on the score for each of the one or more events.

15. The platform server of claim 13, wherein to evaluate each event against the one or more rules comprises to determine, based on one or more machine learning techniques, a score indicating the likelihood that the event deviates from an expected maneuver by the individual taking the road test component.

16. The platform server of claim 15, wherein the instructions, when executed, further cause the platform server to, upon determining that the score exceeds a specified threshold:

generate an alert;

send the alert to a device operated by an assessor of the driver's license examination; and update profile data associated with the individual taking the road test component to include the examination result.

17. The platform server of claim 16, wherein the instructions, when executed, further cause the platform server to:

aggregate the profile data with profile data associated with a plurality of test takers; and generate one or more analytics based on the aggregated profile data.

* * * * *